United States Patent
Hooker (10) Patent No.: US 11,780,603 B2
(45) Date of Patent: Oct. 10, 2023

(54) METHOD FOR RESILIENCY IN COMPUTE RESOURCES IN AVIONICS

(71) Applicant: GE Aviation Systems LLC, Grand Rapids, MI (US)

(72) Inventor: Brent Dale Hooker, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 87 days.

(21) Appl. No.: 17/087,057

(22) Filed: Nov. 2, 2020

(65) Prior Publication Data
US 2022/0135245 A1 May 5, 2022

(51) Int. Cl.
| | | |
|---|---|---|
| *B64D 45/00* | (2006.01) | |
| *G08G 5/00* | (2006.01) | |
| *H04L 45/60* | (2022.01) | |
| *H04L 45/028* | (2022.01) | |

(52) U.S. Cl.
CPC .......... *B64D 45/00* (2013.01); *G08G 5/0021* (2013.01); *G08G 5/0039* (2013.01); *H04L 45/028* (2013.01); *H04L 45/60* (2013.01)

(58) Field of Classification Search
CPC .... B64D 45/00; G08G 5/0021; G08G 5/0039; H04L 45/028; H04L 45/60; G06F 11/0796; G06F 11/143; G06F 11/203
See application file for complete search history.

(56) References Cited

U.S. PATENT DOCUMENTS

| | | | |
|---|---|---|---|
| 8,195,976 B2 | 6/2012 | Rao et al. | |
| 8,452,465 B1 | 5/2013 | Sinha et al. | |
| 8,826,285 B2 * | 9/2014 | Beltrand | G06F 11/2035 |
| | | | 718/103 |
| 9,852,642 B2 | 12/2017 | Butler et al. | |
| 10,360,801 B2 | 7/2019 | Taylor et al. | |
| 2008/0046142 A1 * | 2/2008 | Jordan | H04L 12/40195 |
| | | | 701/36 |
| 2010/0318834 A1 | 12/2010 | Planche | |
| 2012/0144402 A1 | 6/2012 | Preston | |
| 2014/0157041 A1 | 6/2014 | Danielsson et al. | |
| 2019/0355261 A1 | 11/2019 | Blomberg et al. | |

FOREIGN PATENT DOCUMENTS

| | | |
|---|---|---|
| EP | 3043264 A1 | 7/2016 |
| FR | 3031407 A1 | 7/2016 |
| WO | 2013188153 A1 | 12/2013 |

OTHER PUBLICATIONS

Da Fontoura Antonio Augusto et al., "Timing Assurance of Avionic Reconfiguration Schemes Using Formal Analysis", IEEE Transactions on Aerospace and Electronic Systems, IEEE Service Center, Piscataway, NJ, US. vol. 56, No. 1, May 7, 2019, pp. 95-106.

* cited by examiner

*Primary Examiner* — Shon G Foley
(74) *Attorney, Agent, or Firm* — McGarry Bair PC (57) ABSTRACT

A system and method for compiling and dynamically reconfiguring the management of functionalities carried among a set of multiple common compute nodes. During the inoperation of one node of the set of multiple common compute nodes, higher-criticality functionalities can be reassigned to other common nodes to ensure maintained operation of the higher-criticality functionalities.

17 Claims, 4 Drawing Sheets

METHOD FOR RESILIENCY IN COMPUTE RESOURCES IN AVIONICS

TECHNICAL FIELD

The disclosure relates to a method for increased or improved resiliency for an avionics system by utilizing multiple common nodes to support multiple aircraft components or functionalities thereof. The method permits critical functions to be dynamically reorganized among common nodes in the event of a failure or other error, which improves overall system resiliency.

BACKGROUND OF THE INVENTION

Aircraft include an avionics system to manage and support multiple aircraft level functionalities. The avionics system can include multiple computer nodes which can be used to host the functionalities. However, failure of one node can have a negative impact on highly critical functionalities carried on the failed node, as well as multiple other functionalities carried within the individual node.

BRIEF DESCRIPTION

Aspects and advantages of the invention will be set forth in part in the following description, or may be evident from the description, or may be learned through practice of the invention.

In one aspect, the present disclosure relates to a method of increasing resiliency of functionalities operating on an aircraft network system of an aircraft, the method comprising: dynamically reassigning the aircraft functionalities managed by a set of nodes during inoperation of one node of the set of nodes; wherein dynamically reassigning the functionalities is based upon the criticality of the functionalities, and wherein dynamic reconfiguration prioritizes higher-criticality functionalities in the event of inoperation of one node of the set of nodes.

In another aspect, the present disclosure relates to a method of increasing resiliency of an aircraft network system, the method comprising: operating a set of functionalities on the aircraft network system wherein the set of functionalities are managed by a set of compute nodes including at least a first compute node and a second compute node; dynamically reconfiguring the set of functionalities of the aircraft network system by transferring at least on functionality managed by the first compute node to the second compute node in the event of inoperation of the first compute node; wherein dynamically reassigning the functionalities is based upon the criticality of said functionalities and prioritizes higher-criticality functionalities in the event of maloperation of the first compute node.

In yet another aspect, the present disclosure relates to an aircraft network system for managing a set of functionalities for an aircraft, the aircraft network system comprising: a set of functional modules operating the set of functionalities; a set of nodes for managing operation of the set of functionalities; a controller provided on the network system, coupled to the set of functional modules, configured to dynamically reconfigure the set of functionalities based upon the maloperation of one node of the set of nodes; wherein dynamic reconfiguration of the set of functionalities prioritizes higher-criticality functionalities and reassigns high-criticality functions of the set of functionalities from the maloperating node to another properly operating node of the set of nodes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

DETAILED DESCRIPTION

Aspects of the disclosure relate to a system and method for increasing, improving, modifying, altering, or adding resiliency to an avionics system where multiple common computer nodes are used to support multiple aircraft functionalities. More specifically, in the case of an issue, maloperation, error, damage to, or failure of one or more nodes, the functionalities can be dynamically reconfigured among other nodes of the multiple common compute nodes that have not had an issue, error, or failure. Such a reconfiguration can be used to manage and maintain operation of higher-criticality functions and ensure continued operation of such higher-criticality functionalities despite the failure of the initial node.

While the disclosure provided herein is described in reference to an aircraft including an aircraft system including an avionics chassis and related networking, it should be appreciated that alternative implementations are contemplated, including those that do or do not include avionics chassis or boxes, or different implementations or network components than those described herein. Similarly, the system and method as described herein will also have applicability in other mobile or vehicular environments where improving system resiliency among multiple nodes is desirable, such as non-aircraft, terrestrial, or other environments, as well as any non-traditional networked systems utilizing multiple common computer nodes.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also, as used herein, while sensors can be described as "sensing" or "measuring" a respective value, sensing or measuring can include determining a value indicative of or related to the respective value, rather than directly sensing, or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

The terms "coupled," "fixed," "attached to," and the like refer to both direct coupling, fixing, or attaching, as well as indirect coupling, fixing, or attaching through one or more intermediate components or features, unless otherwise specified herein. The singular forms "a", "an", and "the" include plural references unless the context clearly dictates otherwise. Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a five percent or ten percent margin.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Additionally, connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

As used herein, a "system", "controller", "avionics", "component", or a "module" can include at least one processor and memory, while not every component needs at least one processor and memory. A controller or other similar component can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein.

The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile, or non-transient, or non-volatile memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Additionally, as used herein, elements being "electrically connected," "electrically coupled," "communicatively coupled," or "in signal communication" can include an electric transmission or signal being sent, received, or communicated to or from such connected or coupled elements. Furthermore, such electrical connections or couplings can include a wired or wireless connection, or a combination thereof.

As used herein, an "essential", "high criticality" or "highly-critical" functionality, component, process, system, or electrical load can be a subset of one or more functionalities of a power distribution system or aircraft architecture classified or categorized as "essential" or "critical" to the operation of the power architecture, vehicle, or another system. In one non-limiting aspect, an "essential" functionality can be critical to flight operations of an aircraft or critical aircraft systems, and can be defined by relevant federal aircraft regulations or relevant industry standards.

Figure 1:
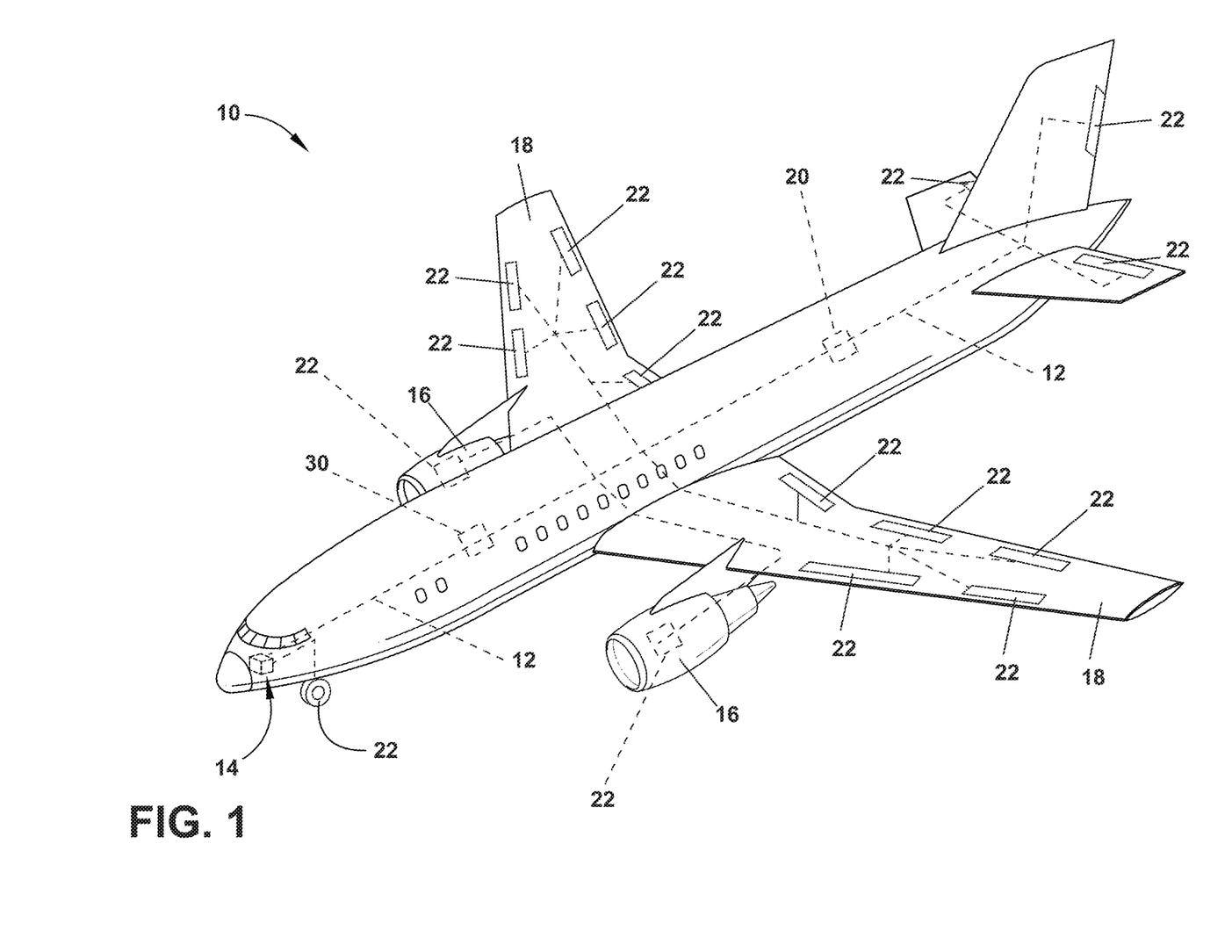
FIG. 1 is a schematic view of an exemplary aircraft and avionics system therefore, in accordance with various aspects described herein.

The disclosure can be implemented in any network or electrical control, operation, or communication system, any aircraft avionics system or network, or other aircraft electrical system. A non-limiting example of an electrical circuit environment that can include aspects of the disclosure can include an aircraft power system architecture, which enables production or supplying of electrical power from a power source (e.g. a generator or power storage unit or device), and delivers the electrical power to a set of electrical loads. Additional non-limiting elements can be included in such an architecture, such as sensors, transmitters, or transceivers in non-limiting examples FIG. 1 schematically illustrates an aircraft 10 including an aircraft network 12 including an avionics chassis 14, which can contain one or more of a CPU, controller, management unit, or a configuration management unit for controlling, communicating, and operating various aspects associated with the flight of the aircraft 10 or components and functionalities associated with the aircraft 10. The aircraft 10 can utilize or incorporate a myriad of electrical or electronic components utilized in operating various aspects of the aircraft 10 either for flight or for non-flight operations. The network 12 as shown in FIG. 1, and as generally used herein, comprises a communication system contained within the aircraft 10. However, it should be appreciated that the network 12, or portions thereof, can include additional remote features, such as a remote memory unit, or even a control tower or airport in communication with the network 12 remote from the aircraft 10.

Functionalities, or a set thereof, can include independent program code executions, functional modules, executions carried on functional modules, independent control modules or functions thereof, executable program partitions, or physical functions carried out by program or software execution, in non-limiting examples.

Non-limiting examples of the aircraft electrical components or functional modules carried among the network 12, which can be used to carry out or operate according to one or more functionalities, can include the avionics chassis 14, turbine engines 16 (provided on each wing 18) including turbine engine components, a transceiver 20, or other avionics components 22. A non-limiting list of additional components can include sensors or other aircraft electrical or mechanical components, such as buttons, displays, user interfaces, control boards, communication means such as headphones or speakers, slats, flaps, engines or portions thereof, controllers, processors, or memory units. Non-limiting examples of sensors can include temperature sensors, pressure sensors, vibration sensors, sound or noise sensors, air temperature sensors, or any other desirable sensor provided on an aircraft. Additionally, the control board provided in the cockpit of the aircraft 10 includes a plurality of electrical components associated with operation of the aircraft 10, which can be supported by the avionics chassis 14 or other network components. Further still, other electrical components can be included as a portion of the network, such as electrical components in the cabin of the aircraft, such as lighting, air conditioning, or passenger entertainment and connection.

Further components can include devices, such as a network switch or interface device. Additional components can include internet routers or transmitters, or other connectivity elements. Additional contemplated components include, but are not limited to, humidity sensors, noise or decibel sensors, gas sensors, pollution sensors, pressure sensors, air speed sensors, angle of attack sensors, weather radar, surveillance radar, altimeter, turbulence radar, LIDAR, and communication transmitters, such as radio or satellite.

It should be further appreciated that functionalities need not have a physical counterpart or a physical action associated with the functionalities, but rather can include software or executables, which can perform monitoring or analysis operations and need not have an associated physical action or result.

The network 12, and components thereon, can be utilized to operate the aircraft 10, or operational characteristics thereof, including systems, subsystems, contained systems, sensing, monitoring, or the like. Operation of the aircraft 10 and the components can be managed, controller, routed, or otherwise utilize multiple common compute nodes to manage the functionalities among the elements connected among the network 12. The network 12, or controller thereon, can be pre-loaded with the aircraft architecture, which can include a set of functionalities related to components provided on the network 12. The aircraft architecture can include information such as a number of nodes utilized in a respective system, subsystem, network 12, or the like, and what information or from what sources the information is carried by or utilized by the nodes, as well as which functionalities are maintained among the nodes. Specific details or other information related to the functionalities can be included within or defined by the architecture, as well.

The aircraft architecture can include information pertaining to the network 12, as well as elements and components thereon. More specifically, information related to the network 12 or the components thereon can include default values, threshold values, number of components, type of components, or any other historical information which may be relevant to a monitoring analysis of the network component.

There are trends to have high integration of components on aircraft, or among multiple aircraft through using Integrated Modular Avionics and Interface Devices that bundle data information onto large databuses or similar systems. Such bundling and use of large databuses or systems can increase the chance of a software fault or common mode failure, maloperation, issue, or error, which can impact a wide range of aircraft functionalities; particularly where multiple functionalities are carried among a common node. Similarly, the network 12 can also consider or monitor hardware aspects of the components, such as hardware faults or component disconnection. However, it should be appreciated that aircraft components should be resilient to the wear out fatigue or physical failures of such components, including, but not limited to, component damage, or damage sustained from external factors or objects. Thus, while monitoring the safety and security of the network, the network 12 or a controller thereon can also effectively monitor the hardware systems or faults thereof via the functionalities thereof.

Figure 2:
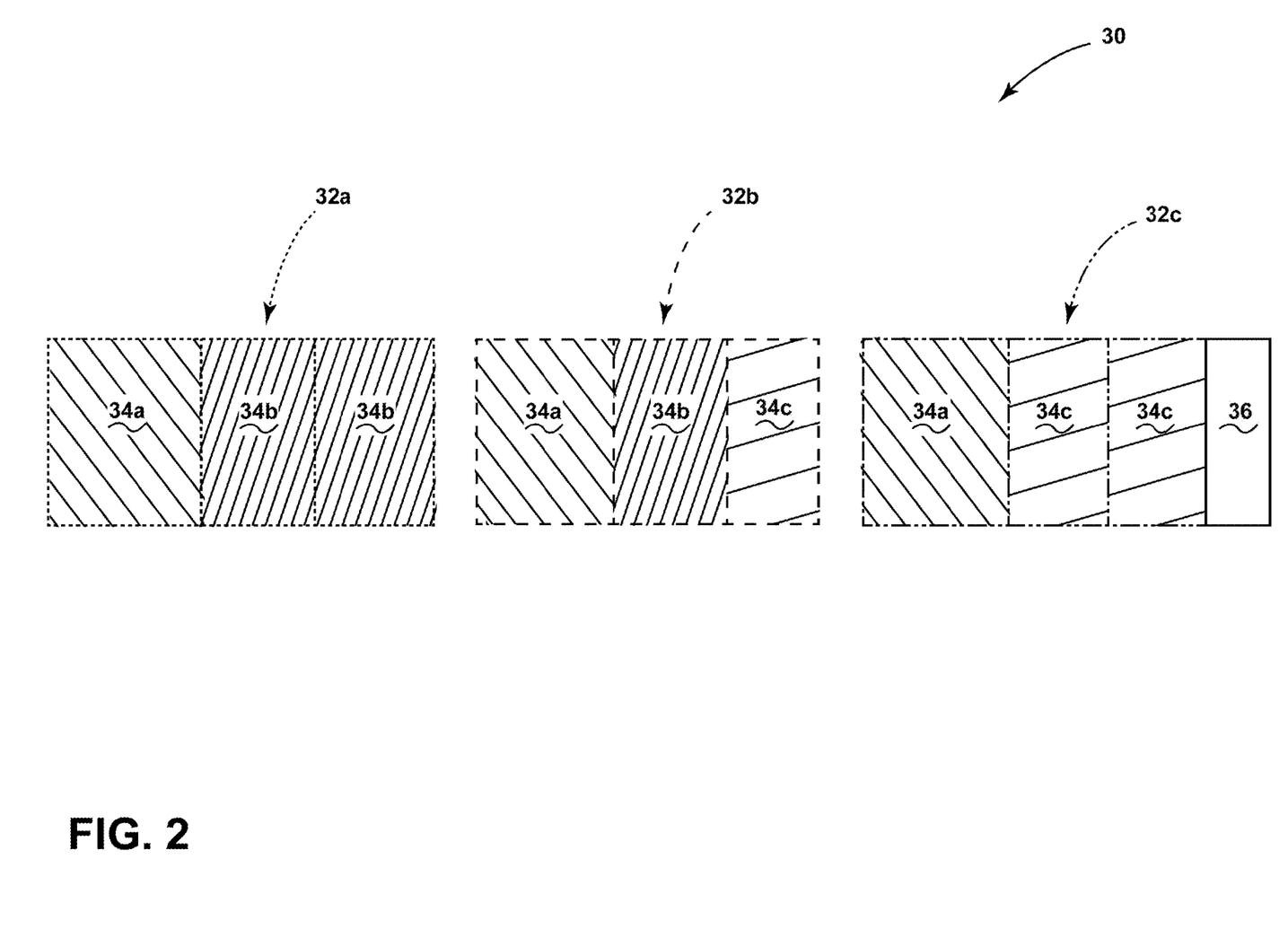
FIG. 2 is a schematic view of an exemplary node configuration with three nodes at normal function.

Referring now to FIG. 2, the network 12 can connect to a system or controller 30 including multiple nodes 32 arranged as a first node 32a, a second node 32b, and a third node 32c. Each node 32 can be configured to manage operation of a set of functions 34, with each node 32 shown as containing three functions 34, and the third node 32c further includes additional unused space 36, where such space 36 can include unused memory or processing power, for example. The functions 34 can be representative of electrical, hardware, or software activities managed by the aircraft 10 over the network 12. Non-limiting examples of functions 34 can include flight control operations, system operations, cabin operations, communication operations, or portions or combinations thereof. It should be further appreciated that each node 32 can have more or less functions 34, and need not be limited to three functions 34 as shown.

Each functionality can be labeled or identified based upon its importance or criticality. More specifically, the functions 34 carried out on the nodes 32 can be identified as high criticality functions 34a, shown with an upper-left to down-right hatching, moderately criticality functions 34b, shown with a tight upper-right to down-left hatching, and low criticality functions 34c, shown with a wider, flatter, upper-right to down-left hatching. It should be appreciated that criticality need not be limited to either high, moderate, or low, but can be represented by any system which can be utilized to arrange or define a hierarchy of the criticality of the functions. For example, in one case, the functions could be given a number from one to one-hundred, with the criticality increasing as the numbers approach one-hundred. Regardless of the system used to identify the criticality, the functions 34 can be identified and organized based upon their criticality.

The system shown in FIG. 2 can represent the network 12 and the functions 34 carried thereon during normal operations. In a typical aircraft system, a large plurality of nodes 32 would be required to handle a multitude of aircraft functions, and it should be understood that FIG. 2 is merely showing an exemplary portion of the aircraft network 12 represented among the nodes 32. Over time, it should be understood that the nodes 32 can fail due to any number of occasions, such as a power failure, wear or cycle fatigue, connection issue, or damage in non-limiting examples. In such an event, there is the potential that highly critical functions can be lost, or can be left without a node 32 to manage or support operation of the function. In such a case, operation of the aircraft would be continued without the continued operation of the highly-critical functionality.

Figure 3:
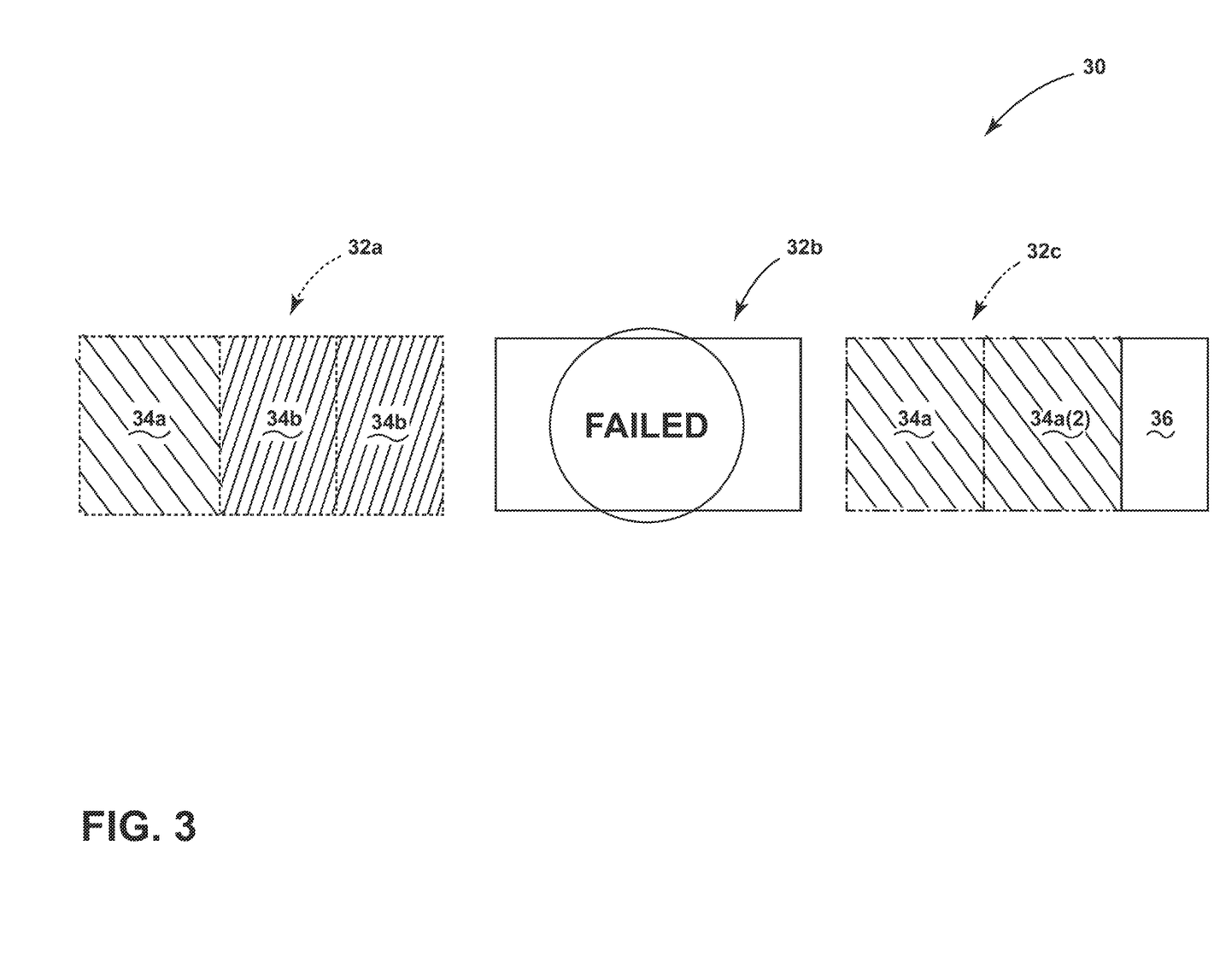
FIG. 3 is another schematic view of the node configuration of FIG. 2, with one node at a fail condition, and the remaining nodes rehosting the highly critical functionalities.

Referring to FIG. 3, a condition has occurred that resulted in the failure of the second node 32b. Therefore, the higher-criticality function 34a that was managed by the second node 32b (see FIG. 2) are no longer being maintained due to the failure. If a loss of a node 32 is imminent or has occurred, functionalities 34 that are carried or managed on the lost node could be routed over one or more other nodes on the network 12, in order to maintain continued operation of critical functions. As such, the remaining active nodes 32a, 32c can be reconfigured to handle the higher-criticality functions 34 that were originally held by the second node 32b. More specifically, the highly-critical function 34a that was previously held by the second node 32b has been transferred to the third node 32c, so that the critical function now labeled as 34a(2) can continue to operate via the third node 32c, despite the failure of the second node 32b. Accordingly, the third node 32c no longer handles the two low-criticality functionalities 34c, which may have been moved to another node, or may no longer be handled over the network 12. Additionally, the third node 32c now has a greater amount of spare memory or processing power 36 such that the third node 32c can carry additional high-criticality functions 34 in the event of another node failing. However, such space could be occupied by moderate criticality functions, which could be replaced with higher-criticality functions 34 in the event of additional node failures.

Another example of architecture can include that the network 12 contains information regarding which aircraft functions are bundled in which equipment, and therefore, which are carried by which node. For example, in 'federated systems' each node can carry one aircraft function, whereas the current trend is to move toward integrated avionics systems, where a node carries and manages multiple aircraft functions. Knowledge of the failure of a node in an integrated system, allows a prediction and warning of which aircraft functions may be or have been diminished or impacted, which then permits the system to have dynamic reconfiguration of the aircraft and systems to compensate therefore. Specifically, such dynamic reconfiguration provides for transferring managed operation of higher-criticality functions 34 to other nodes 32, maintaining operation of the highest-criticality functions.

Such a dynamic reconfiguration can be done with or without pilot intervention, when in flight, maintenance, landing, or preflight. For example, such a failure can be communicated to a pilot, where the pilot can choose to reconfigure the system to maintain the higher-criticality functions. In another example, the system itself can determine which functions have been impacted, and automatically reconfigure the higher-criticality functions to operational nodes, such the system can dynamically reconfigure itself without any intervention.

Additionally, utilizing the aircraft architecture and managing the functions thereon can provide early warning, such as to the pilots or maintenance personnel, that some aircraft components or functions may be or have met a threshold, have been impacted by failures, or if a failure is anticipated or imminent. With dynamic reconfiguration of the system as necessary, a lower criticality function could be changed or updated in lieu of a higher criticality component or function in anticipation of such an event, before occurrence of a specific failure. Monitoring elements of the aircraft architecture or functionalities against a threshold value can be utilized to determine or predict such events. Example elements that can be monitored can include, but are not limited to, remaining memory, processing power or processing capabilities, changes in latency, or changes in execution time of particular functionalities.

Figure 4:
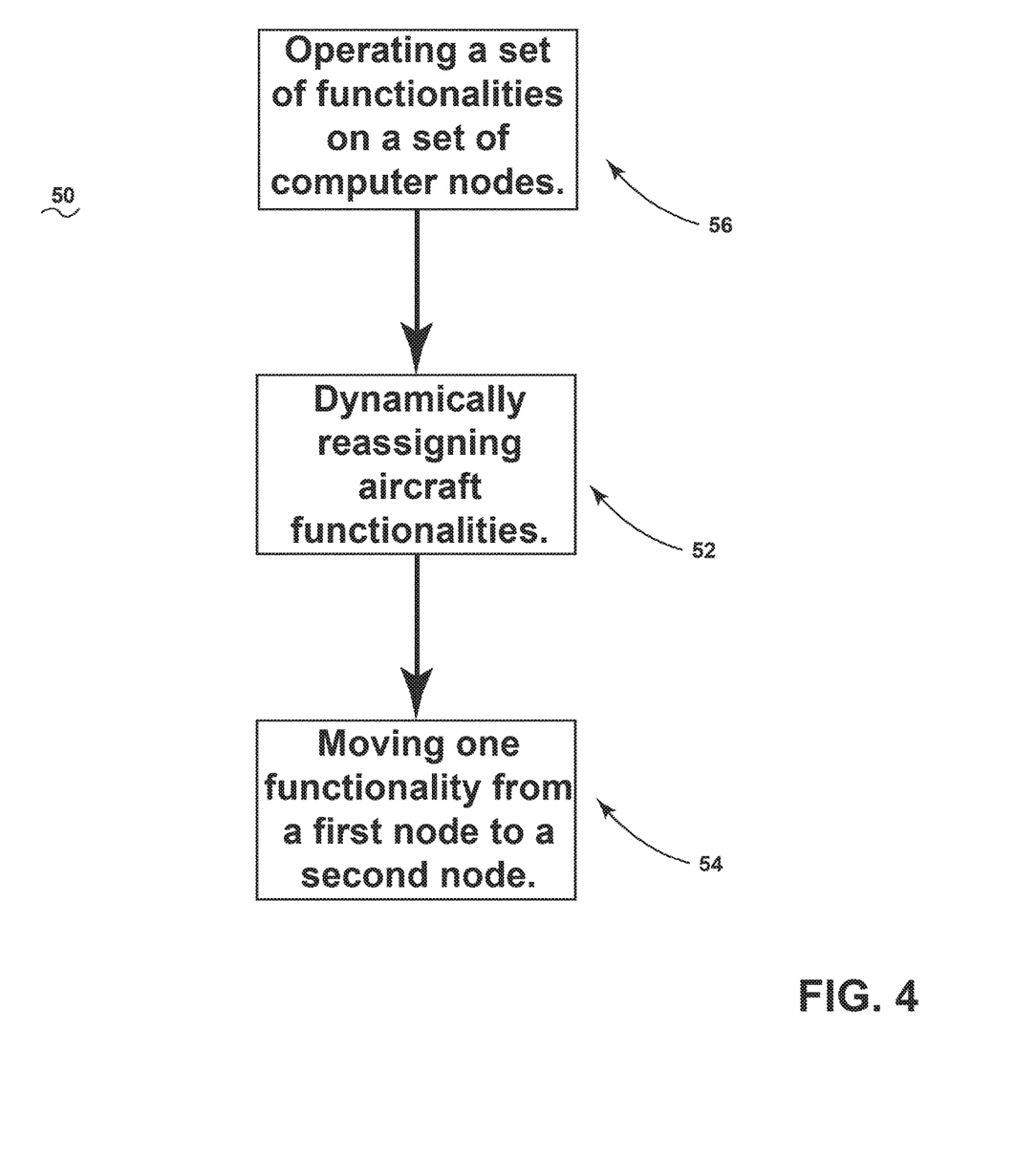
FIG. 4 is a flow chart showing a method of increasing resiliency on aircraft networks.

Referring now to FIG. 4, a method 50 for increasing resiliency of functionalities operating on a network system of an aircraft, or for managing and maintaining operation of higher-criticality functionalities can include, at 52, dynamically reassigning functionalities of the aircraft that are managed by a set of nodes during inoperation of one or more nodes of the set of nodes. The dynamic reassignment of the functionalities can be based on the criticality of the functionalities such that the dynamic reconfiguration prioritizes higher-criticality functionalities in the even of inoperation of one node of the set of nodes. Inoperation can include, in non-limiting examples, failure, damage, maloperation, error, change in flight condition, change in flight status, or any other event which negatively impacts operation of the functionalities or the node carrying the functionalities or changes the criticality of said functionalities. Such a change in flight status, in non-limiting examples, could include change from takeoff to in-flight, or from in-flight to cruise, or from climbing after takeoff to cruise, or from in-flight to land.

Furthermore, the functionalities can be at least somewhat dependent on a schedule, which can be based, for example, on status of the aircraft. For example, the operation of the functionalities and which functionalities are operable can change based upon the status of the airplane or flight. Therefore, a schedule can be utilized to manage operation as well as dynamic reconfiguration of the functionalities on the nodes, as the criticality of particular functionalities can change based upon status of the airplane or the flight.

Prioritizing higher-criticality functions can further include non-operation of low criticality or lower-criticality functionalities, originally operated by a second compute node, in order to maintain operation of the higher-criticality functionalities on the second compute node instead of the low or lower-criticality functionalities.

In another example, dynamic reassignment can be based upon an algorithm contained on the network 12. For example, the algorithm can be utilized to determine a hierarchy for the criticality of functionalities carried among all nodes on the network 12. Such a hierarchy can include high criticality, moderate criticality, and low criticality, in one non-limiting example, while any suitable hierarchy system can be utilized. Additionally, the algorithm can be utilized to update the hierarchy, such as being based upon the current flight condition or flight status of the aircraft. Further still, the algorithm can utilize specific details of the functionality, the node, or the component carrying out operation of the functionality. Such details can include, in non-limiting examples, amount of memory, processing power, changes in latency, changes in execution time of said functionality, or if there are other functionalities dependent on the operation of the current functionality. Additionally, the algorithm can be utilized to arrange the hierarchy such that the nodes or functionalities are dynamically reassigned in order to maintain suitable memory, processing power, latency, execution time, or otherwise in the occasion of a dynamic reassignment.

The method 50 can further include, at 54, where dynamic reassignment comprises moving at least one functionality from a first node of the set of nodes to a second node of the set of nodes. Such a dynamic reassignment can be accomplished, in one example, by updating network switches to permit reconfiguration of message routing during or after reassignment to ensure proper system communication after or during a reassignment of functionalities.

The method 50 can further include, at 56, operating a set of functionalities on the aircraft network system where the set of functionalities are managed by a set of compute nodes with at least a first compute node and a second compute node.

The system and network 12 described herein provides for increased or improved resiliency of an aircraft to failures of a compute node 32. The aircraft 10 carrying the network 12 then includes increased or improved operational resiliency, as highly critical functions can be maintained, even in the even of a failure of one or more nodes 32 originally carrying higher-criticality functions.

The system as described herein further provides for reduced size, weight, and power (SWAP), by reducing the overall number of computer nodes needed on an individual aircraft 10. For example, the system can reconfigure the functionalities carried by the nodes 32 based upon the current system condition. In one example, some functionalities are of high criticality during takeoff and landing, while such functionalities are of low criticality during flight. As such, it should be appreciated that the dynamic reconfiguration of the functionalities carried on the nodes 32 can be based upon the present criticality of the system, which can vary based upon the current condition of the aircraft. As such, it should be appreciated that dynamic reconfiguration need not be triggered by a failure, but can be based upon other requirements, such as current condition or status of the aircraft.

The system and network 12 as discussed herein provides for improved system and operational safety and security for the aircraft network 12 and functionalities 34 carried thereon. Similarly, monitoring the nodes and the criticality of functions thereon can provide for dynamic reconfiguration of the network 12, as well as how information is processed and used over the network 12. Additionally, the network 12 and related system provides for cost reduction and saving through decreased redundancies in the network 12 and less required nodes 32. Additionally, an improved system resiliency will also provide for cost savings, at least as reduced maintenance and repair, as well as reduced unscheduled or unplanned incidence due to node or functionality failure.

To the extent not already described, the different features and structures of the various aspects can be used in combination with each other as desired. That one feature cannot be or is not illustrated or described in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

1. A method of increasing resiliency of functionalities operating on an aircraft network system of an aircraft, the method comprising: dynamically reassigning the functionalities of the aircraft managed by a set of nodes during inoperation of one node of the set of nodes; wherein dynamically reassigning the functionalities is based upon the criticality of the functionalities, and wherein dynamic reconfiguration prioritizes higher-criticality functionalities in the event of inoperation of one node of the set of nodes.

2. The method of any preceding clause wherein inoperation of the one node of the set of nodes is the result of failure of the one node of the set of nodes.

3. The method of any preceding clause wherein inoperation of the one node of the set of nodes is due to a change in flight condition of the aircraft.

4. The method of any preceding clause wherein a change in flight condition includes a change from takeoff to in-flight or a change from in-flight to landing.

5. The method of any preceding clause wherein the dynamic reassignment is based upon an algorithm.

6. The method of any preceding clause wherein the algorithm defines a hierarchy of criticality for the functionalities.

7. The method of any preceding clause wherein the hierarchy of criticality includes high criticality, moderate criticality, and low criticality.

8. The method of any preceding clause wherein the algorithm reorganizes the hierarchy based upon the flight condition of the aircraft.

9. The method of any preceding clause wherein the algorithm includes one or more of determining memory, determining processing power, determining changes in latency, determining changes in execution time of the functionality, determining if the functionality includes additional functionalities dependent upon the initial functionality.

10. The method of any preceding clause wherein the algorithm guarantees one or more of sufficient memory, sufficient processing power, acceptable latency, sufficient execution time, or continued operation of another function dependent upon the functionality considered by the algorithm when dynamically reassigning functionalities among one or more nodes of the set of nodes.

11. The method of any preceding clause wherein dynamic reassigning further comprises moving at least one functionality from a first node of the set of nodes to a second node of the set of nodes.

12. The method of any preceding clause further comprising scheduling different set of functionalities.

13. The method of any preceding clause further comprising updating network switches to allow for dynamic reconfiguration of message routing.

14. A method of increasing resiliency of an aircraft network system, the method comprising: operating a set of functionalities on the aircraft network system wherein the set of functionalities are managed by a set of compute nodes including at least a first compute node and a second compute node; dynamically reconfiguring the set of functionalities of the aircraft network system by transferring at least on functionality managed by the first compute node to the second compute node in the event of inoperation of the first compute node; wherein dynamically reassigning the functionalities is based upon the criticality of said functionalities and prioritizes higher-criticality functionalities in the event of maloperation of the first compute node.

15. The method of any preceding clause wherein prioritizing higher-criticality functionalities includes the non-operation of low-criticality functionalities originally managed by the second compute node in order to continue function of the prioritized, higher-criticality functionalities.

16. The method of any preceding clause wherein inoperation of the first compute node includes failure of the first compute node.

17. The method of any preceding clause wherein the dynamic reconfiguration of the set of functionalities is managed by an algorithm to ensure that such reconfiguration guarantees sufficient memory, sufficient processing power, acceptable changes to latency, and acceptable changes to relative execution time of the affected functionalities of the set of functionalities.

18. An aircraft network system for managing a set of functionalities for an aircraft, the aircraft network system comprising: a set of functional modules operating the set of functionalities; a set of nodes for managing operation of the set of functionalities; a controller provided on the network system, coupled to the set of functional modules, configured to dynamically reconfigure the set of functionalities based upon the maloperation of one node of the set of nodes; wherein dynamic reconfiguration of the set of functionalities prioritizes higher-criticality functionalities and reassigns high-criticality functions of the set of functionalities from the maloperating node to another properly operating node of the set of nodes.

19. The aircraft network system of any preceding clause wherein the controller further includes an algorithm to determine the dynamic reconfiguration of the set of functionalities.

20. The aircraft network system of any preceding clause further comprising a set of aircraft components communicatively coupled to one another via the aircraft network system and configured to operate according to the set of functionalities.

To the extent not already described, the different features and structures of the various embodiments of the present disclosure may be used in combination with each other as desired. For example, one or more of the features illustrated and/or described with respect to one of the systems or a component thereof can be used with or combined with one or more features illustrated and/or described with respect to the other of the system or component thereof. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of increasing resiliency of functionalities operating on an aircraft network system of an aircraft, the method comprising:
   during inoperation of one node of a set of nodes, determining a flight condition of the aircraft;
   determining a criticality of the functionalities of the aircraft that are managed by the set of nodes; and
   dynamically reassigning the functionalities of the aircraft that are managed by the set of nodes;
   wherein the dynamically reassigning the functionalities is based upon the criticality of the functionalities, and wherein the dynamically reassigning prioritizes higher-criticality functionalities based upon an algorithm, wherein the algorithm defines a hierarchy of criticality for the functionalities, and further dynamically changes the hierarchy of criticality for the functionalities based upon the flight condition of the aircraft.

2. The method of claim 1, wherein inoperation of the one node of the set of nodes is a result of failure of the one node of the set of nodes.

3. The method of claim 1, wherein inoperation of the one node of the set of nodes is due to a change in the flight condition of the aircraft.

4. The method of claim 3, wherein the change in flight condition includes a change from takeoff to in-flight or a change from in-flight to landing.

5. The method of claim 1, wherein the hierarchy of criticality for the functionalities includes high criticality, moderate criticality, and low criticality.

6. The method of claim 1, wherein the algorithm includes one or more of determining memory, determining processing power, determining changes in latency, determining changes in execution time of the functionality, determining if the functionality includes additional functionalities dependent upon an initial functionality.

7. The method of claim 6, wherein the algorithm guarantees one or more of sufficient memory, sufficient processing power, acceptable latency, sufficient execution time, or continued operation of another function dependent upon the functionality considered by the algorithm when dynamically reassigning functionalities among one or more nodes of the set of nodes.

8. The method of claim 1, wherein dynamically reassigning further comprises moving at least a portion of one functionality from a first node of the set of nodes to a second node of the set of nodes.

9. The method of claim 1, further comprising scheduling different sets of functionalities.

10. The method of claim 1, further comprising updating network switches to allow for dynamic reconfiguration of message routing.

11. A method of increasing resiliency of a network system, for an aircraft, the method comprising:
   operating a set of functionalities on the aircraft network system wherein the set of functionalities are managed by a set of compute nodes including at least a first compute node and a second compute node;

determining a flight condition of the aircraft;
determining a criticality of the functionalities of the aircraft that are managed by the set of compute nodes;
defining a hierarchy of criticality for the functionalities;
dynamically reconfiguring the set of functionalities of the network system for the aircraft, by transferring at least one functionality managed by the first compute node to the second compute node in the event of inoperation of the first compute node;
wherein dynamically reconfiguring the functionalities is based upon the criticality of the functionalities and prioritizes higher-criticality functionalities in the event of maloperation of the first compute node; and
dynamically changing the hierarchy of criticality based upon the flight condition of the aircraft.

12. The method of claim 11, wherein prioritizing higher-criticality functionalities includes a non-operation of low-criticality functionalities originally managed by the second compute node in order to continue function of the prioritized, higher-criticality functionalities.

13. The method of claim 11, wherein inoperation of the first compute node includes failure of the first compute node.

14. The method of claim 11, wherein the dynamic reconfiguration of the set of functionalities is managed by an algorithm to ensure that such reconfiguration guarantees sufficient memory, sufficient processing power, acceptable changes to latency, and acceptable changes to relative execution time of the affected functionalities of the set of functionalities.

15. An aircraft network system for managing a set of functionalities for an aircraft, the aircraft network system comprising:

a set of functional modules operating the set of functionalities;
a set of nodes for managing operation of the set of functionalities;
a controller provided on the network system, coupled to the set of functional modules, configured to determine
a flight condition of the aircraft;
determine a criticality of the functionalities of the aircraft that are managed by the set of compute nodes;
define a hierarchy of criticality for the functionalities,
dynamically reconfigure the set of functionalities based upon a maloperation of one node of the set of nodes, and
dynamically change the hierarchy of criticality for the functionalities based upon the flight condition of the aircraft;
wherein dynamic reconfiguration of the set of functionalities prioritizes higher-criticality functionalities and reassigns high-criticality functions of the set of functionalities from the maloperating node to another properly operating node of the set of nodes.

16. The aircraft network system of claim 15, wherein the controller further includes an algorithm to determine the dynamic reconfiguration of the set of functionalities.

17. The aircraft network system of claim 15, further comprising a set of aircraft components communicatively coupled to one another via the aircraft network system and configured to operate according to the set of functionalities.

* * * * *